United States Patent [19]

Shimizu

[11] Patent Number: 4,878,004
[45] Date of Patent: Oct. 31, 1989

[54] MOTOR-OPERATED POWER STEERING APPARATUS

[75] Inventor: Yasuo Shimizu, Tochigi, Japan

[73] Assignee: Honda Giken Kogyo Kabushiki Kaisha, Tokyo, Japan

[21] Appl. No.: 183,813

[22] Filed: Apr. 20, 1988

[30] Foreign Application Priority Data

Apr. 20, 1987 [JP] Japan .................................. 62-98257

[51] Int. Cl.$^4$ ............................................. G05B 11/28
[52] U.S. Cl. .................................. 318/599; 318/434; 180/79.1
[58] Field of Search ................ 318/599, 434; 180/79.1

[56] References Cited

U.S. PATENT DOCUMENTS 4,532,567 7/1985 Kade ................................ 318/434 X
4,624,334 11/1986 Kelledes et al. .................... 180/79.1
4,660,671 4/1987 Behr et al. ....................... 180/79.1 X Primary Examiner—William M. Shoop, Jr.
Assistant Examiner—Saul M. Bergmann
Attorney, Agent, or Firm—Armstrong, Nikaido, Marmelstein, Kubovcik & Murray

[57] ABSTRACT

A motor-operated power steering apparatus suppresses the heating of an electric motor and its driver circuit by limiting a maximum value for a drive signal which drives the motor based on the average value of currents flowing through the motor. The motor includes an electric motor for generating an assistive force to be applied to a steering force transmitting mechanism, a detector for detecting a vehicle steering condition, a motor controlling unit responsive to a signal from the detector for producing a drive signal to control operation of the motor, a motor driver responsive to the drive signal for driving the motor, a current detector for detecting a magnitude of a current flowing through the motor and producing a signal indicating the detected magnitude of the current, an average current calculating unit for calculating an average value of currents flowing through the motor in a prescribed period of time based on the signal from the current detector, and a driving signal limiting unit for establishing an upper limit based on the average current and limiting a maximum value for the drive signal from the motor control unit below the upper limit.

6 Claims, 5 Drawing Sheets

MOTOR-OPERATED POWER STEERING APPARATUS

BACKGROUND OF THE INVENTION

1. Field of the Invention

The present invention relates to a motor-operated power steering apparatus, and more particularly to a motor-operated power steering apparatus in which the heating of an electric motor and a driver therefor is effectively suppressed.

2. Description of the Relevant Art

There are known motor-operated power steering apparatus in which the power of an electric motor is transmitted to a steering force transmitting mechanism for assisting the steering force. In such a motor-operated power steering apparatus, a relatively large current flows through the motor to cause the motor and its driver circuit to be heated. These components tend to be also heated to high temperature by the heat from other heated parts. Japanese Laid-Open Utility Model Publication No. 61-91465 discloses a motor-operated power steering apparatus in which the components are protected from a high-temperature environment. In the disclosed motor-operated power steering apparatus, when the temperature of the motor exceeds a predetermined temperature, the current flowing through the motor is limited to suppress the heating of the motor and other heated components.

The current flowing through the motor is limited on the basis of the temperature of the motor which is of relatively large heat capacity. Therefore, heat control may not properly reflect the thermal condition of the motor and other parts. For example, even if the current supplied to the motor is not to be limited because the temperature of the motor has started to be lowered, the current is limited when the motor temperature remains higher than the predetermined temperature. As a result, the current fed to the motor is limited for a long period of time, thus impairing the driver's feeling as to the steering action.

SUMMARY OF THE INVENTION

It is an object of the present invention to provide a motor-operated power steering apparatus in which components are protected from high temperature without spoiling the driver's feeling while engaging in the steering action.

According to the present invention, there is provided, as shown in FIG. 1 of the accompanying drawings, a motor-operated power steering apparatus comprising an electric motor for generating an assistive force to be applied to a steering force transmitting mechanism, a detector for detecting a vehicle steering condition, a motor controlling device responsive to a signal from the detector for producing a drive signal to control operation of the motor, a motor driving responsive to the drive signal for driving the motor, current detecting for detecting a magnitude of a current flowing through the motor and producing a signal indicating the detected magnitude of the current, average current calculating device for calculating an average value of currents flowing through the motor in a prescribed period of time based on the signal from the current detecting device, and driving signal limiting device for establishing an upper limit based on the average current and limiting a maximum value for the drive signal from the motor controlling device below the upper limit.

With the present invention, the maximum value for the drive signal for the motor is limited on the basis of the current flowing through the motor which corresponds to the amount of heat emitted from the motor and its driver circuit. Therefore, the motor can be controlled in a manner to reflect the heated conditions of the motor and the driver circuit, so that the heating of these heated components can effectively be suppressed.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A motor-operated power steering apparatus according to the present invention will now be described with reference to FIGS. 2 through 4.

Figure 1:
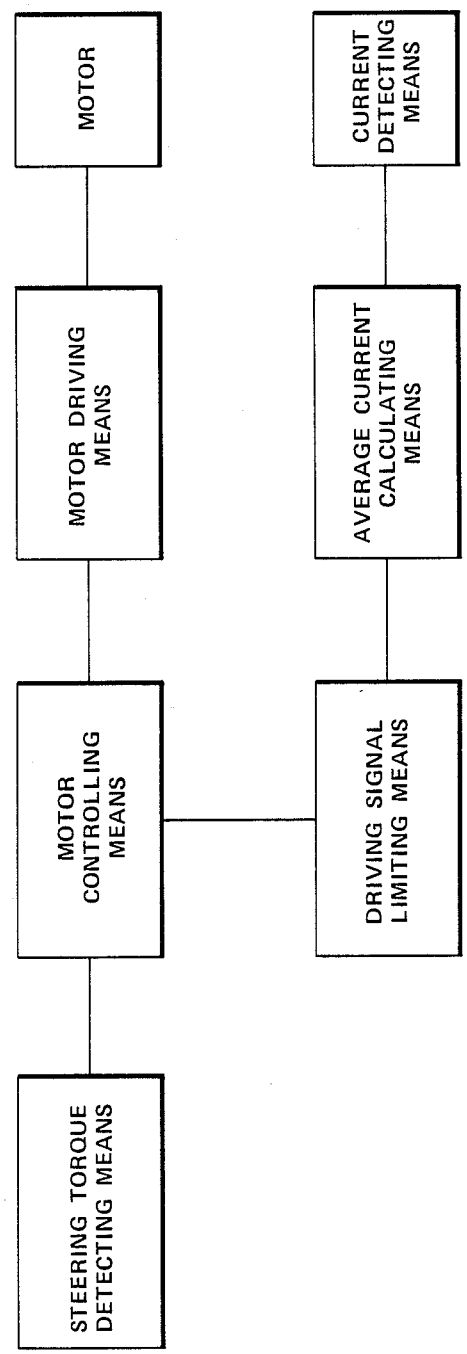
FIG. 1 is a block diagram of a basic arrangement for controlling an electric motor according to the present invention.
Figure 2:
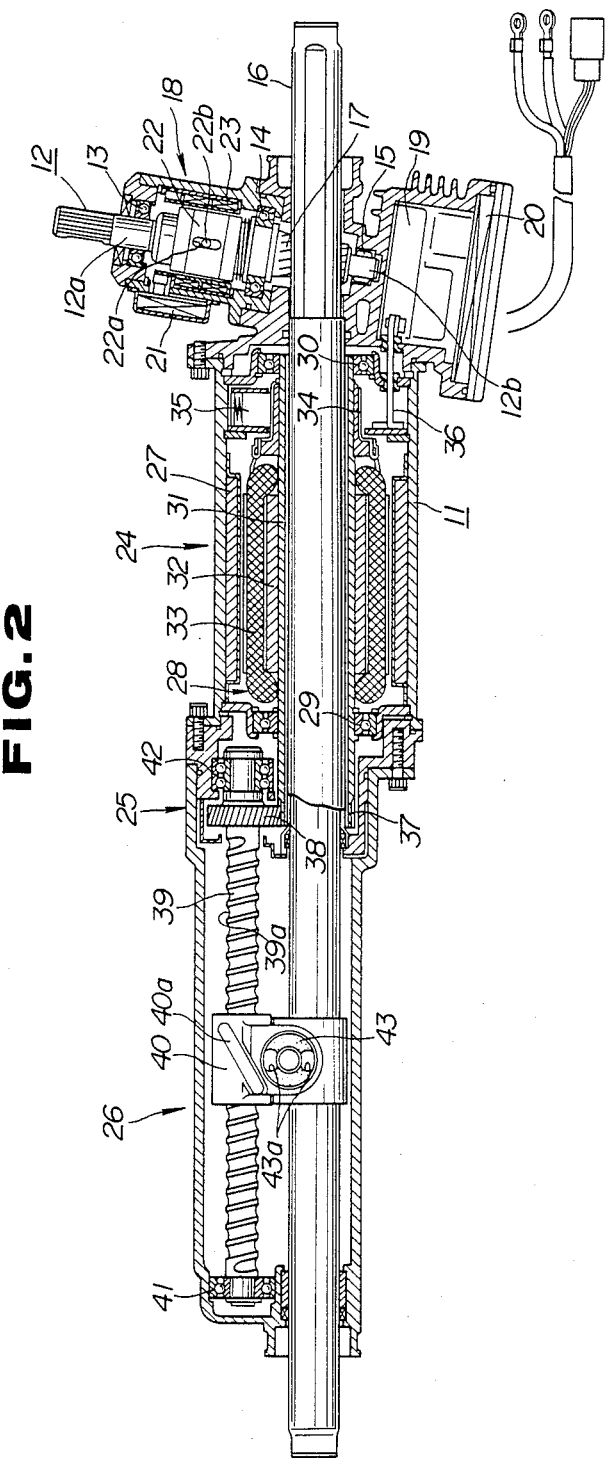
FIG. 2 is a cross-sectional view of a steering mechanism of a motor-operated power steering apparatus according to the present invention.

As shown in FIG. 2, a gear case 11 supported on a vehicle body (not shown) comprises a plurality of case members joined together. A pinion shaft 12 operatively coupled to a steering wheel (not shown) is rotatably supported in a righthand portion (as shown) of the gear case 11. A rack shaft 16 is axially slidably supported in the gear case 11, the rack shaft 16 being operatively coupled to steerable wheels through steering linkages. The pinion shaft 12 includes upper and lower shafts 12a, 12b connected to each other for relative angular movement. A pinion 17 is fixed to the lower shaft 12b in mesh with rack teeth (not shown) on the back of the rack shaft 16.

In the gear case 11, there are disposed a steering torque sensor 18 around the pinion shaft 12 and a driver unit 19 and a control unit 20 which are positioned below the pinion shaft 12. An interface circuit 21 is mounted on an upper portion of the gear case 11 near the steering torque sensor 18. The steering torque sensor 18 comprises a substantially cylindrical movable iron core 22 fitted axially displaceably over an intermediate portion of the pinion shaft 12, and a differential transformer 23 for detecting axial displacement of the movable iron core 22. The movable iron core 22 has a cam groove 22a defined therein and receiving a pin 22b fixed to the upper shaft 12a of the pinion shaft 12. The movable iron core 22 is axially displaceable according to the relative angular displacement between the upper and lower shafts 12a, 12b upon twisting of a torsion bar therebetween, i.e., the sterring torque applied to the pinion shaft 12.

The differential transformer 23 is electrically connected to the interface circuit 21 which supplies an AC pulse signal and applies steering torque signals indicative of the direction and magnitude of the steering torque to the control unit 20. As described later on, the control unit 20 serves to process the steering torque signals applied from the interface circuit 21 and other signals to produce a control signal for enabling the driver uint 19 to drive an electric motor 24.

The gear case 11 accommodates the motor 24 disposed centrally therein coaxially with the rack shaft 16 for producing an assisting force, and a speed reducer mechanism 25 and a ball screw mechanism 25 which are positioned leftwardly of the motor 24. The motor 24 comprises a field magnet 27 secured to the inner wall surface of the gear case 11, and a rotor 28 rotatably disposed between the field magnet 27 and the rack shaft 16. The rotor 28 has an output sleeve 31 rotatably supported by a pair of bearings 29, 30, a laminated iron core 32 disposed securely around the output sleeve 31 coaxially therewith and having a skewed groove, and a multiplex armature winding 33 disposed securely around the output sleeve 31 coaxially therewith in covering relation to the laminated iron core 32. The armature winding 33 is electrically connected to the driver unit 19 by wires 36 through a commutator 34 fixedly mounted on the output sleeve 31 and a brush 34 held in sliding contact with the commutator 34.

The speed reducer mechanism 25 comprises a smaller-diameter gear 37 on the outer peripheral surface of the the lefthand end of the output sleeve 31, and a larger-diameter gear 38 meshing with the smaller-diameter gear 37. The speed reducer mechanism 25 operatively connects the motor 24 and the ball screw mechanism 26 and reduces the speed of rotation from the motor 24 and transmits the rotation of the reduced speed to the ball screw mechanism 26.

The ball screw mechanism 26 has a screw shaft 39 with a helical groove 39a defined on its outer peripheral surface, a ball nut 40 fitted over the screw shaft 39 in mesh therewith, and a number of balls (not shown) rollingly riding in the helical groove 39a of the screw shaft 39 and the helical groove (not shown) of the ball nut 40. The screw shaft 39 is rotatably supported in the gear case 11 parallel to the rack shaft 16 by means of a pair of bearings 41, 42. The larger-diameter gear 38 of the speed reducer mechanism 25 is fixedly mounted on one end of the screw shaft 39. The ball nut 40 has a tube 40a for circulating the balls therethrough. The ball nut 40 is nonrotatably fixed to the rack shaft 16 by a bushing 43 for axial movement in unison therewith. The bushing 43 is made of an elastomeric material such as rubber and includes a pair of holes 43a defined in a direction normal to the direction in which the rack shaft 16 axially extends. The bushing 43 therefore has a small spring constant in the direction normal to the rack shaft 16. The ball screw mechanism 26 thus converts rotational movement of the screw shaft 3 to linear movement of the rack shaft 16 for thereby transmitting the assisting force from the motor 24 to the rack shaft 16.

Figure 3:
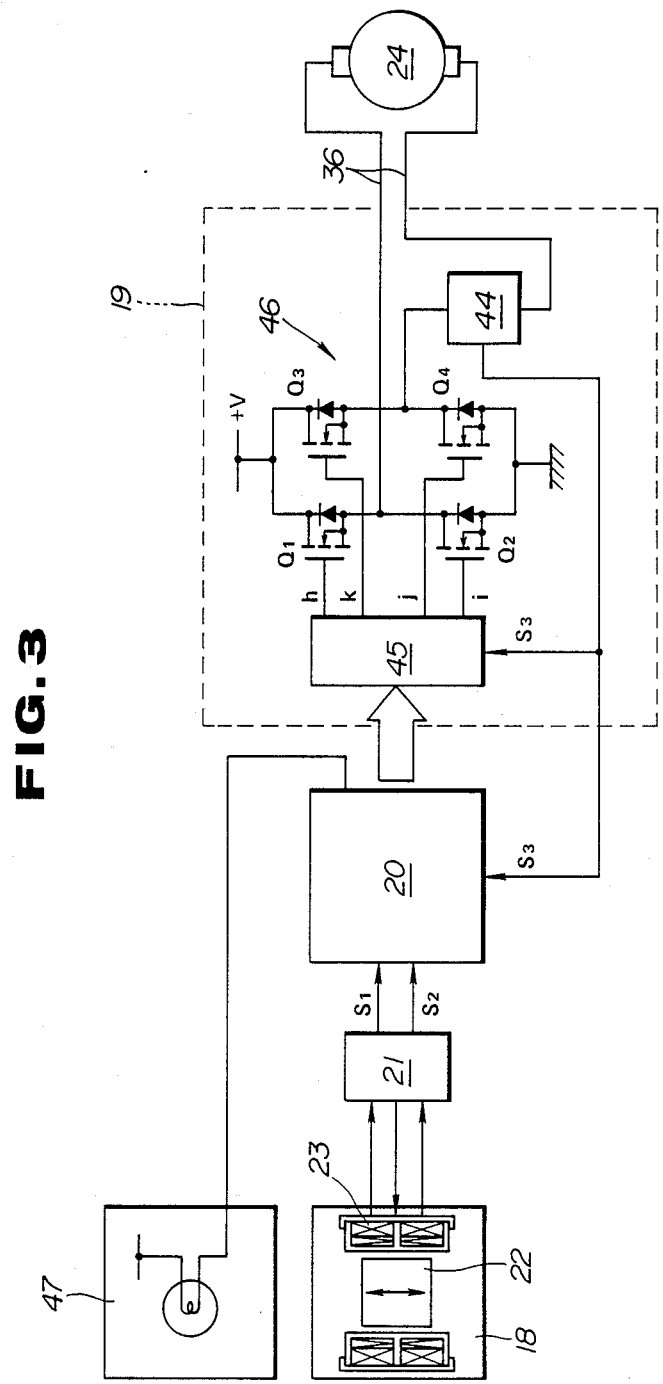
FIG. 3 is a block diagram of the motor-operated power steering apparatus.
Figure 4:
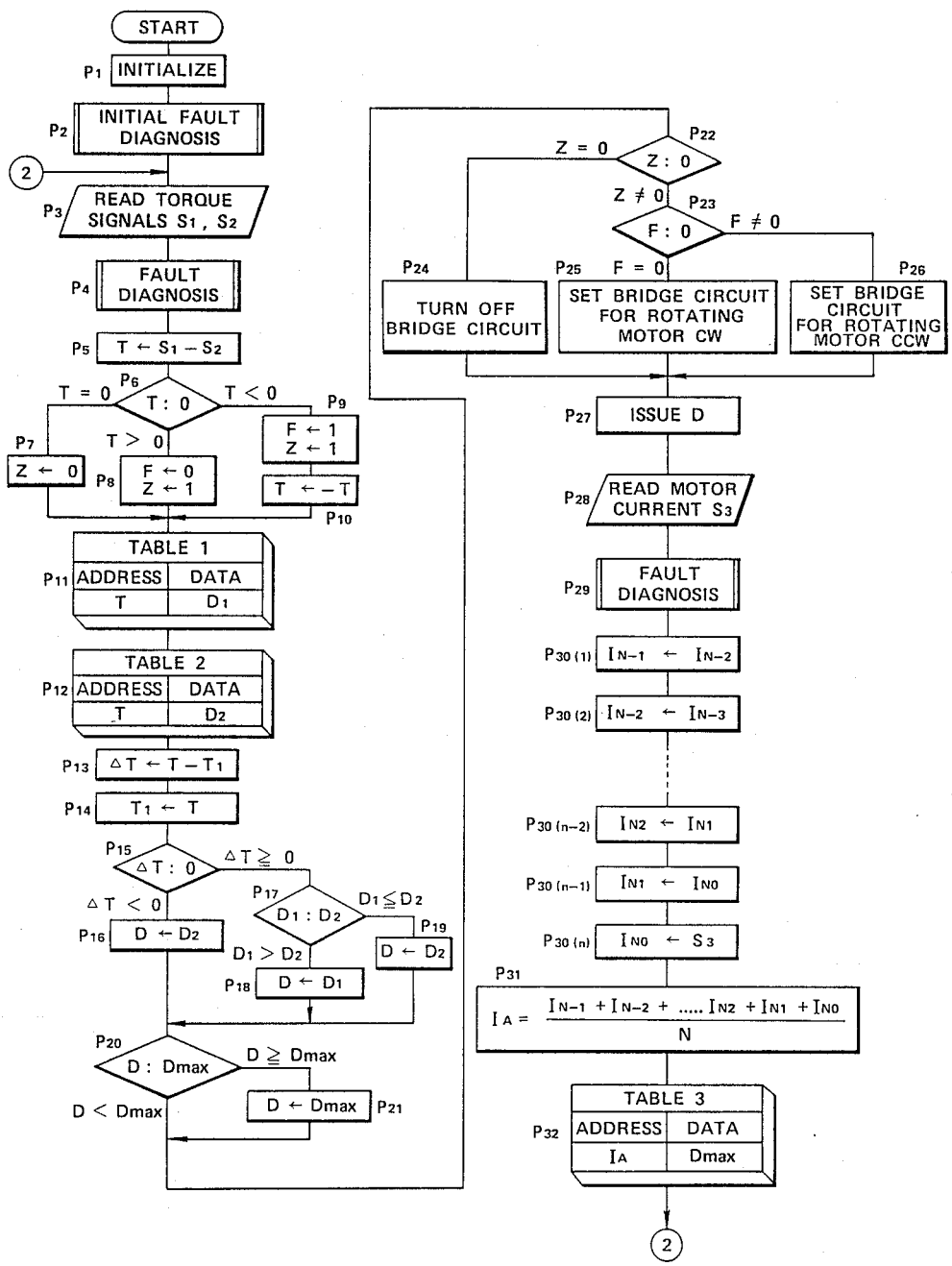
FIG. 4 is a flowchart of a control sequence of the motor-operated power steering apparatus.
Figure 5:
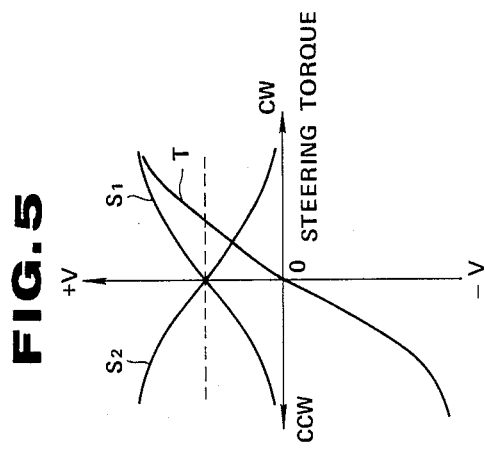

As shown in FIG. 3, the interface circuit 21 coupled to the steering torque sensor 18 is electrically connected to the control unit 20. The interface circuit 21 has an oscillator circuit, an AC output circuit, a rectifier circuit, and a low-pass filter. The interface circuit 21 serves to supply an AC pulse signal to the differential transformer 23, convert signals from the differential transformer 23 to analog signals S1, S2 representing the direction and magnitude of the steering torque applied, and issue the signals S1, S2 to the control unit 20. The analog signals S1, S2 produced by the interface circuit 21 have complementary characteristic curves with respect to the direction in which the steering torque is applied, as shown in FIG. 5.

The control unit 20 is connected to the driver unit 19 and supplied with an output signal S3 from a current detector 44 in the driver unit 19. The control unit 20 includes a CPU, a ROM, a RAM, and an A/D converter. The control unit 20 is programmed to process the output signal S3 from the current detector 44 and the steering torque signal S1, S2 and to issue a drive signal to a driver circuit 45 in the driver unit 19 according to a program stored in the ROM. In the illustrated embodiment, the motor 24 is chopper-controlled. The driver signal produced by the control unit 20 includes information as to a duty factor and information as to the direction in which a current flows.

A warning lamp 47 positioned in the vicinity of the driver's seat is connected to the control unit 20. The warning lamp 47 is energized when the power steering apparatus is diagnosed as suffering a fault.

The driver unit 19 has a driver circuit 45, a current detector 44, and a bridge circuit 46. In response to the drive signal from the control unit 20, the driver circuit 45 applies four pulse-width-modulated (PWM) signals h, i, j, k to the bridge circuit 46. The driver circuit 45 is connected to the current detector 44 for controlling a current supplied to the motor 24 at a value commanded by the drive signal based on the output signal S3 from the current detector 44, through a feedback control loop. The bridge circuit 46 has four field-effect transistors (FETs) Q1, Q2, Q3, Q4 connected between a power supply +V and ground. The motor 24 is connected to the junction between the FETs Q1, Q2 and the junction between the FETs Q3, Q4 through the wires 36. The PWM signals h, i, j, k generated by the driver circuit 45 are applied to the gates of the FETs Q1, Q2, Q3, Q4, respectively, for turning them on altogether or selectively to supply a current to the motor 24.

Figure 6:
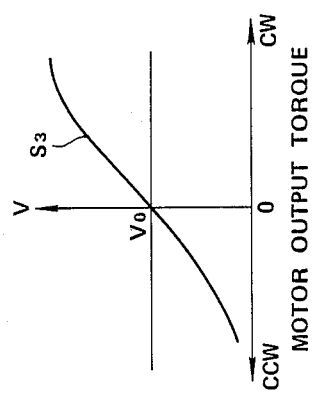
FIGS. 5 and 6 are graphs showing the characteristics of detected signals.

The current detector 44 is connected between the motor 24 and the bridge circuit 46 for detecting the current supplied to the motor 24. The current detector 44 applies the output signal S3 which is indicative of the magnitude of the current to the control unit 20 and the driver circuit 45. The output signal S3 from the current detector 44 has a characteristic curve with respect to the direction in which the output torque of the motor 24 acts, as shown in FIG. 6. The direction in which the output torque of the motor 24 acts as indicated in FIG. 6. represents the direction in which the motor 24 rotates. Vo in FIG. 6 indicates a reference voltage which serves as another reference for that direction.

Operation of the motor-operated power steering apparatus will be described below with reference to the flowchart of FIG. 4.

For starting the apparatus, a keyswitch (not shown) is turned on to enable the CPU in the control unit 20 to execute a processing sequence, described below, for controlling the motor 24.

In a step P1, the CPU in the control unit 20 is initialized to erase data stored in internal registers and address them. Then, an initial fault diagnosis subroutine is carried out in a step P2. If all components function properly, then control goes to a step P3 for further processing operation. In the step P3, the output signals S1, S2 from the steering torque sensor 18 are read in. The steering torque sensor 18 is then diagnosed for faults according to a subroutine in a step P4. If the steering torque sensor 18 operates normally, then control proceeds to a step P5.

In the step P5, the signal S2 is subtracted from the signal S1 to produce a signal T indicating the steering torque applied (hereinafter referred to as a "steering torque T"). As shown in FIG. 5, the sign of the steering torque T indicates the steering direction, and the magnitude therefore indicates the magnitude of the steering torque. A step P6 ascertains whether the steering torque T is positive, negative, or 0. If the steering torque T is 0, then a flag Z is set to 0 in a step P7. If the steering torque T is positive, the flag Z is set to 1 and a flag F is set to 0 in step P8. If the steering torque T is negative, the flag Z is set to 1 and the flag F is set to 1 in step P9, and the absolute value of the steering torque T is determined in step P10.

Figure 8:
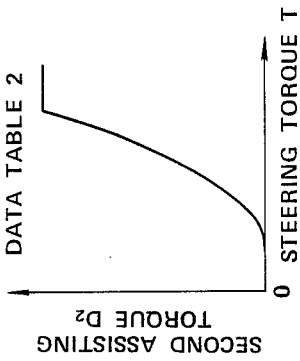
Figure 7:
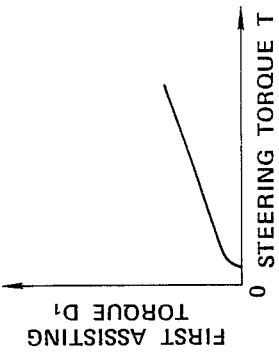

In step P11, a first steering assistive torque signal D1 (hereinafter referred to as a "first assistive torque D1") is generated from a table 1 shown in FIG. 7 using the absolute value of the steering torque T as an address. Likewise, a second steering assistive torque signal D2 (hereinafter referred to as a "second assistive torque D2") is generated from a table 2 shown in FIG. 8 using the absolute value of the steering torque T as an address. The first and second assistive torques D1, D2 represent the duty factor of a current to be passed through the motor 24 and correspond to the magnitude of the assistive force (assistive torque) generated by the motor 24.

In a step P13, comparative data T1 is subtracted from the steering torque T to produce a difference $\Delta T$. The comparative data T1 has been set to 0 in step P1 when a first routine is executed, i.e., when the apparatus is started. When each of second and following routines is executed, the comparative data T1 has replaced with the steering torque T in step P4 in the preceding routine. More specifically, in each of the second and following routines, the steering torque T is used as the comparative data T1 in step P4 and stored for the next routine. Therefore, the difference $\Delta T$ obtained in the step P13 indicates a change in the steering torque T. Since the routines are periodically executed, the difference $\Delta T$ indicates a rate-of-change of the steering torque. The difference $\Delta T$ will hereinafter be referred to as a "steering torque rate-of-change $\Delta T$".

The steering torque rate-of-change $\Delta T$ is checked for its sign in step P15. If the steering torque rate-of-change $\Delta T$ is negative, then the second assistive torque D2 is used as output data D in step P16. If the steering torque rate-of-change $\Delta T$ is 0 or positive, then control goes to step P17.

In step P17, the first and second assisitve torques D1, D2 are compared with respect to their magnitudes. If the first assistive torque D1 is greater than the second assistive torque D2, then the first assistive torque D1 is used as output data D in step P18. If the first assistive torque D1 is less than or equal to the second assistive torque D2, then the second assistive torque D2 is used as output data D in step P19. The output data D represents the duty factor of a drive signal to be applied from the control unit 20 to the driver circuit 45, and hence the duty factor of a current to be supplied to the motor 24. The output data D corresponds to the magnitude of an assistive force to be generated by the motor 24. Therefore, according to steps P15, P16, P17, P18, P19, when the steering torque T is increased, the motor 24 generates a large assistive force, and when the steering torque T is reduced, the motor 24 generates a small assistive force. Therefore, the driver can have a good feeling while performing the steering action. The output data D will hereinafter referred to as an "assistive force D".

In a next step P20, the assistive force D is compared with comparative data Dmax. If the assistive force D is equal to or larger than the comparative data Dmax, then the assistive force D is replaced with the comparative data Dmax in step P21 which is followed by step P22. As described later, the comparative data Dmax indicates an upper limit for the duty factor which is determined by the average value of the current supplied to the motor 24. When the first routine is executed, i.e., when the apparatus is started, the comparative data Dmax is set to a maximum allowable value for the motor 24. The assistive force D, i.e., the duty factor of the current supplied to the motor 24 is limited to a value less than or equal to the comparative data Dmax in steps P20, P21, for thereby suppressing the heating of the motor 24 or the FETs Q1, Q2, Q3, Q4 of the driver unit 19.

Step P22 checks the flag Z for its value. If the flag Z is 1, then a next step P23 checks the flag F for its value. If the flag Z is 0, then all of the FETs Q1, Q2, Q3, Q4 of the bridge circuit 46 are turned off in step P24. If the flag F is 0 in step P23, then a drive signal is generated by the bridge circuit 46 for rotating the motor 24 in one direction (clockwise in the embodiment). If the flag F is in step P23, then a drive signal is generated by the bridge circuit 46 for rotating the motor 24 in the other direction (counterclockwise in the embodiment). Thereafter, the drive signal is applied to the driver circuit 45 in step P27 thereby to enable the bridge circuit 46 to supply the motor 24 with a current of the duty factor D in a direction dependent on the direction in which the motor 24 is to rotate. Now, the motor 24 generates an assistive force which is transmitted via the ball screw mechanism 26 and the bushing 43 to the rack shaft 16 for thereby reducing the manual steering force applied by the driver. At this time, the bushing 43 prevents vibration from being transmitted without lowering the steering response since the bushing 43 has a large spring constant in the direction in which the rack shaft 16 extends and a small spring contant in the direction normal to that direction. As a result, the driver can get a good steering feeling.

In step P28, the signal S3 from the current detector 44 is read. Then, the current detector 44 is diagnosed for failures according to a subroutine in step P29. If the current detector 44 functions normally, then control goes to step P30(1) through P30(n) (which are collectively represented by a step P30 below).

Figure 9:
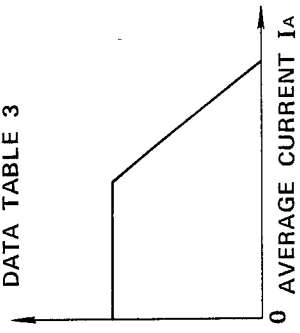
FIGS. 7, 8, and 9 are graphs representing data graphs employed in the control sequence.

In step P30, the currents S3 and $I_{N0} - I_{N-2}$ which were read in the past n routines including the present routine are successively stored in a register. In step P31, the average current $I_A$ of the n currents is calculated. Then, using the average current $I_A$ as an address, the maximum comparative data Dmax, referred to above, is determined from a table 3 shown in FIG. 9. Therefore, in the processing steps P20, P21, the current to be passed through the motor 24 is prevented from exceeding the maximum current when a next routine is executed. Accordingly, the heating of the motor 24 and other associated parts is suppressed, so that the space surrounding the motor 24 or the driver unit 19 is prevented from being heated to high temperature.

With the present invention, as described above, the maximum value for currents to be supplied to the motor is limited on the basis of the average value of the currents flowing through the motor in a certain period of time. Therefore, the heating of the motor and its driver circuit is effectively suppressed according to their heated conditions without being affected by the heat capacity of the motor. When the current flowing through the motor is reduced to lower the amount of heat emitted from the motor, a current corresponding to the steering torque is immediately supplied to the motor. The motor and its associated components are accordingly protected from undesirable heat without impairing the driver's feeling during the steering action.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated power steering apparatus comprising:
    an electric motor for generating an assistive force to be applied to a steering force transmitting mechanism;
    a detector for detecting a vehicle operating condition of a steering wheel;
    motor controlling means responsive to a signal from said detector for producing a drive signal to control operation of said electric motor;
    motor driving means responsive to said drive signal for driving said electric motor;
    current detecting means for detecting a magnitude of a current flowing through said electric motor and for producing a signal indicating the detected magnitude of the current;
    average current detecting means for calculating an average value of the currents flowing through said electric motor in a prescribed period of time based on the signal from said current detecting means;
    upper limit determining means for determining an upper limit for the drive signal from said motor controlling means based on said average current; and
    driving signal limiting means for comparing said drive signal with said upper limit and for limiting a maximum value of the drive signal to a value less than said upper limit.

2. A motor-operated power steering apparatus according to claim 1, wherein said detector comprises a steering torque sensor for generating a signal representing the direction and magnitude of a steering torque applied.

3. A motor-operated power steering apparatus according to claim 2, wherein said motor controlling means comprises means for two different drive signals based on the signal from said steering torque sensor and for issuing a greater one of said two different drive signals when said steering torque increases.

4. A motor-operated power steering apparatus according to claim 1, wherein said motor driving means comprises means for generating PWM signals to drive said motor, said drive signal produced by said motor controlling means containing a duty factor of said PWM signals.

5. A motor-operated power steering apparatus according to claim 4, wherein said driving signal limiting means comprises means for limiting the duty factor of the drive signal, produced by said motor controlling means, to a value less than said upper limit.

6. A motor-operated power steering apparatus according to claim 1, wherein said average current calculating means comprises means for calculating said average current based on magnitudes of a plurality of currents detected within said prescribed period of time.

* * * * *